(12) United States Patent
Vaccari

(10) Patent No.: US 9,131,663 B2
(45) Date of Patent: Sep. 15, 2015

(54) LEAD EQUIPPED WITH MEANS FOR BLOCKING THE EXTENSIBLE CORD

(75) Inventor: Carlo Vaccari, Castelgomberto (IT)

(73) Assignee: FERPLAST S.P.A., Castelgomberto (IT)

( * ) Notice: Subject to any disclaimer, the term of this patent is extended or adjusted under 35 U.S.C. 154(b) by 141 days.

(21) Appl. No.: 13/582,654

(22) PCT Filed: Mar. 5, 2010

(86) PCT No.: PCT/IB2010/050956
§ 371 (c)(1),
(2), (4) Date: Dec. 3, 2012

(87) PCT Pub. No.: WO2011/107833
PCT Pub. Date: Sep. 9, 2011

(65) Prior Publication Data
US 2013/0119180 A1 May 16, 2013

(51) Int. Cl.
*B65H 23/16* (2006.01)
*A01K 27/00* (2006.01)

(52) U.S. Cl.
CPC .................................. *A01K 27/004* (2013.01)

(58) Field of Classification Search
USPC ................... 242/396, 396.1–396.4; 119/796
See application file for complete search history.

(56) References Cited

U.S. PATENT DOCUMENTS

| 4,501,230 | A | 2/1985 | Talo |
| 6,148,773 | A * | 11/2000 | Bogdahn ................ 119/796 |
| 6,648,261 | B2 * | 11/2003 | Irving ................. 242/384.7 |
| 8,251,020 | B2 * | 8/2012 | Matthews .............. 119/796 |
| 8,522,727 | B2 * | 9/2013 | McBounds ............. 119/796 |
| 2006/0207522 | A1 | 9/2006 | Perkitny |

FOREIGN PATENT DOCUMENTS

| DE | 29804615 | 5/1998 |
| DE | 29816372 | 4/1999 |

OTHER PUBLICATIONS

International Searching Authority, Search Report for International Application PCT/IB2010/050956, Dec. 20, 2010 (EPO), 3 pages.

* cited by examiner

*Primary Examiner* — Sang Kim
(74) *Attorney, Agent, or Firm* — Ference & Associates LLC

(57) ABSTRACT

An extensible cord lead comprising a casing (11) containing a winding wheel (13) equipped with housings (15) intercepted by a pushbutton (16) to allow the partial or total blocking of the cord, the pushbutton (16) being equipped with a forward position blocking device consisting of a cursor (20) which slides or rotates in a transverse direction with respect to the axis of the pushbutton (16) in which it is inserted, said cursor (20) being activated by a thumb-turn (21) located on the head of the pushbutton (16), said cursor (20) being able to move from a blocked position to free sliding of the pushbutton, entering and exiting transversally to the sliding axis of the pushbutton (16), in a housing (22) in the box-like casing (11) of the winding device.

7 Claims, 4 Drawing Sheets

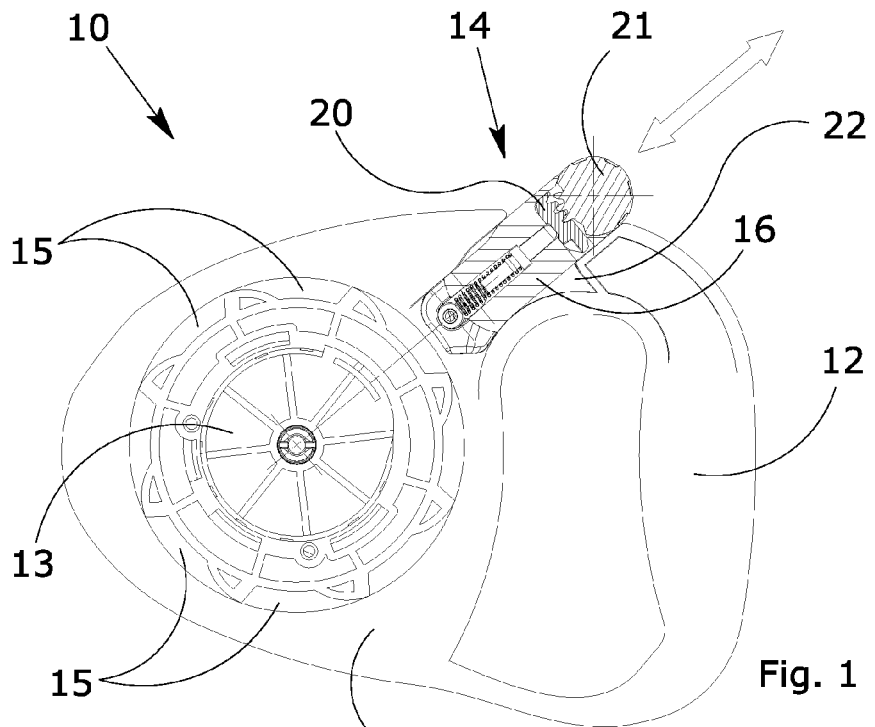
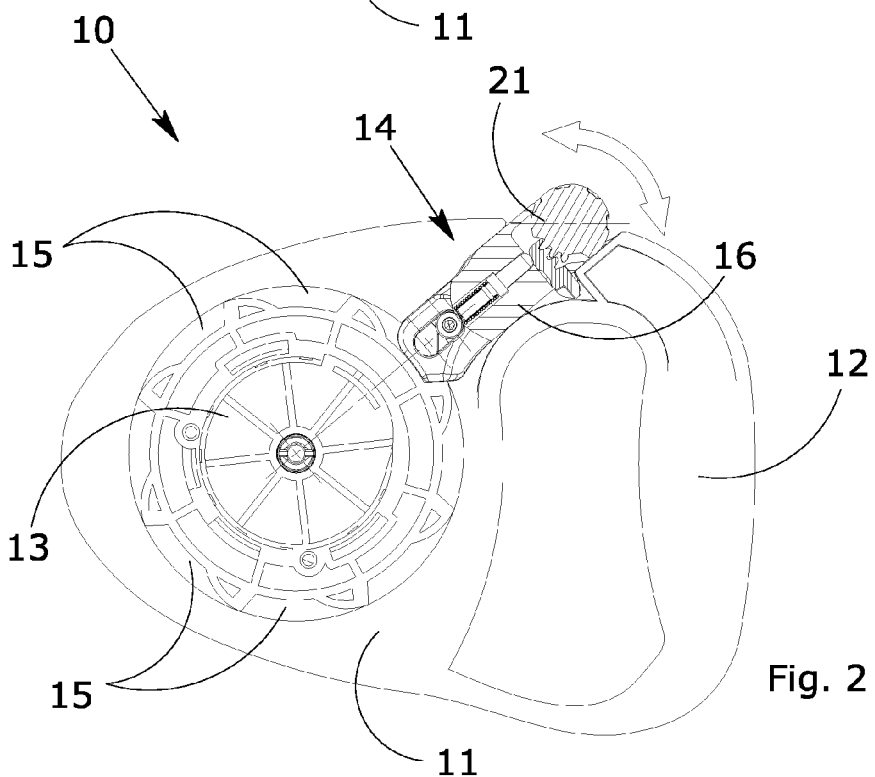

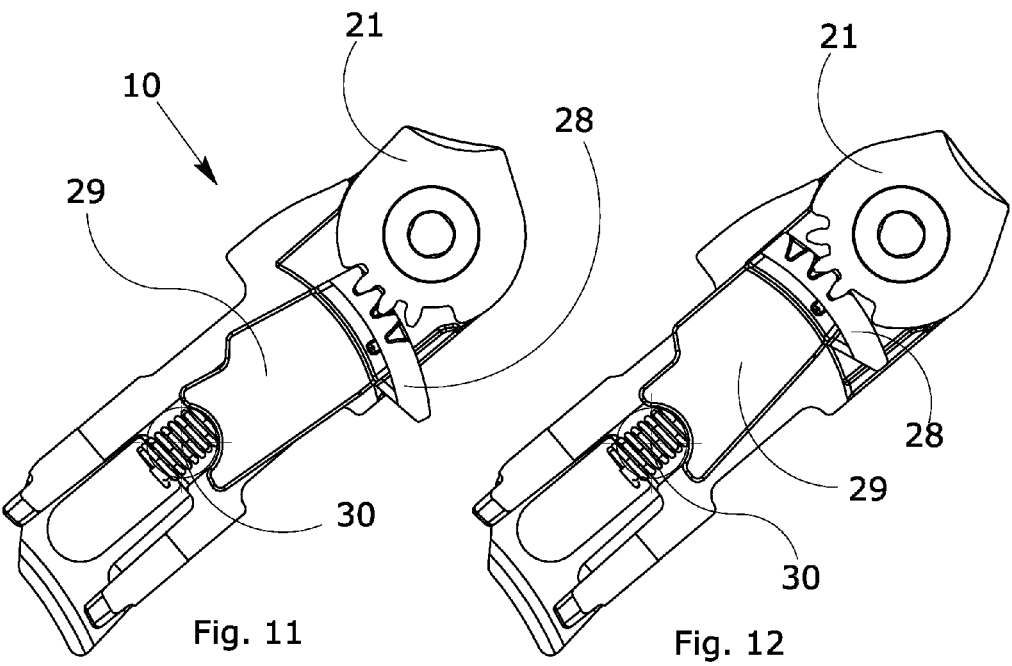
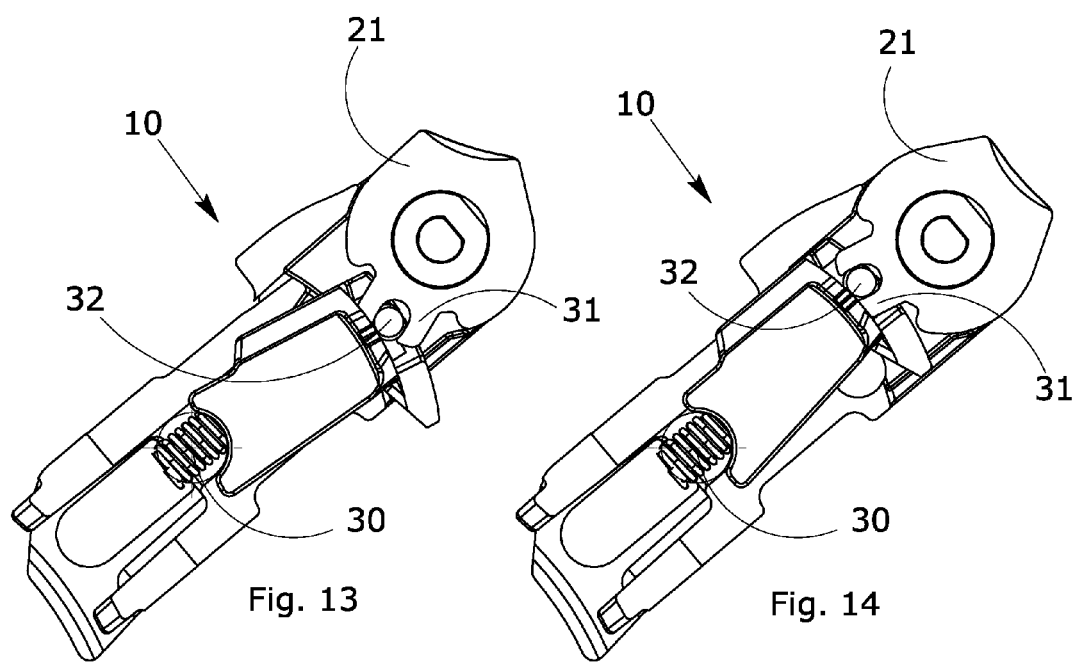

LEAD EQUIPPED WITH MEANS FOR BLOCKING THE EXTENSIBLE CORD

TECHNICAL FIELD

This invention concerns a lead equipped with a wheel winding device for an extensible cord, made in such a way as to allow perfect and easy control of the automated device and blocking of the automatic winder in the required position.

The wheel cord-winding device according to the invention foresees the use of a blocking device which, unlike currently known blocking devices, comprises a safety stop element positioned directly on the pushbutton. This makes it possible on one hand to improve the manoeuvrability of the device by the user and, on the other hand, to simplify the production and assembly of the various components, providing important practical and economic advantages.

The winding device for extensible leads according to the invention is constructed in such a way as to combine the concepts of ergonomics and easy use in a single product.

This invention can be applied in the pet accessory sector, in particular in the sector of accessories such as leads for pets such as, for example, dogs, cats, or similar.

BACKGROUND ART

Pets that need to be walked are usually accompanied using leads equipped with a grip to be held by the user and a coupling element, generally the spring-clip type, which is attached to the pet's collar.

Some types of background art leads also foresee the use of a wind-up type cord which can be extended to allow sudden movements by the animal and also to give the pet greater freedom with a wider range of movement.

Winding devices for leads normally consist of a box-like body, provided with an anatomical grip, inside which is a wheel which can wind up the cord. The end of the cord or tape protrudes through an appropriate opening and is equipped with a spring clip which is attached to the pet's collar.

The tape which protrudes from the casing is short, that is to say the length of a normal lead, while the extensible cord attached to the tape can extend for several metres when unwound, then rewinding automatically by intervention of an internal steel mechanism.

The retractable tape can easily be blocked by means of the temporary block or fixed block, by slightly pressing the pushbutton which acts as a stop element or brake of the winding device.

There are numerous different means currently in use which block the winding device partially or completely.

For temporary blocking it is sufficient to press the pushbutton, so that the brake blocks the winding device for as long as the pushbutton is held down, preventing the pet from moving away.

In some cases, in addition to the temporary block pushbutton, useful for example when the dog should walk in step with the user, there is also a safety pushbutton which blocks the lead even when the temporary pushbutton is released, allowing the lead to remain at a fixed length.

The safety pushbutton on traditional lead winding devices presents a series of problems, however, making it difficult to use since it is usually positioned beside the temporary pushbutton. It also involves construction problems due to the presence of auxiliary mechanical components alongside the main mechanical device.

DESCRIPTION OF THE INVENTION

This invention proposes to provide a lead for pets, equipped with a wheel winding device for an extensible cord and provided with a cord blocking device, which can eliminate or at least reduce the drawbacks mentioned above.

The invention also proposes to provide a pet lead equipped with a wheel winding device for an extensible cord and provided with a cord blocking device which is simple and extremely practical to use, since the safety brake is located on the same pushbutton as the temporary stop.

This is achieved by means of a pet lead equipped with a winding device for an extensible cord, the features of which are described in the main claim.

The dependent claims describe advantageous embodiments of the invention.

The main advantages of this solution concern the fact that the lead according to the invention is equipped with a winding device for an extensible cord provided with safety blocking means which are simple to produce and easy to use.

The device according to the invention therefore substantially consists of a pet lead equipped with a wheel winding device for an extensible cord, the permanent blocking of which consists of a cursor activated by a thumb-turn positioned on the pushbutton.

When using the device, it is sufficient to press the partial block pushbutton to keep the device blocked with the thumb, and when complete blocking is required the thumb-turn on the upper part of the pushbutton can be rotated, allowing the associated cursor to transversally penetrate the housing in the sliding compartment which acts as a stop for the fixed part.

DESCRIPTION OF THE DRAWINGS

Other features and advantages of the invention will become clearer on reading the following description of one embodiment of the invention, given as a non-binding example, together with the help of the accompanying drawings, in which:

FIG. 1 represents a schematic view of a wheel winder for extensible leads equipped with a blocking device according to the invention, in the open position;

FIG. 2 shows a schematic view of a wheel winder for extensible leads equipped with a blocking device according to the invention, in the safety closed position;

FIGS. 11 and 12 are schematic views showing a fourth embodiment with a double gear type blocking device;

FIGS. 13 and 14 are schematic views showing a fifth embodiment with a fork type blocking device.

DESCRIPTION OF ONE EMBODIMENT OF THE INVENTION

Figure 3:
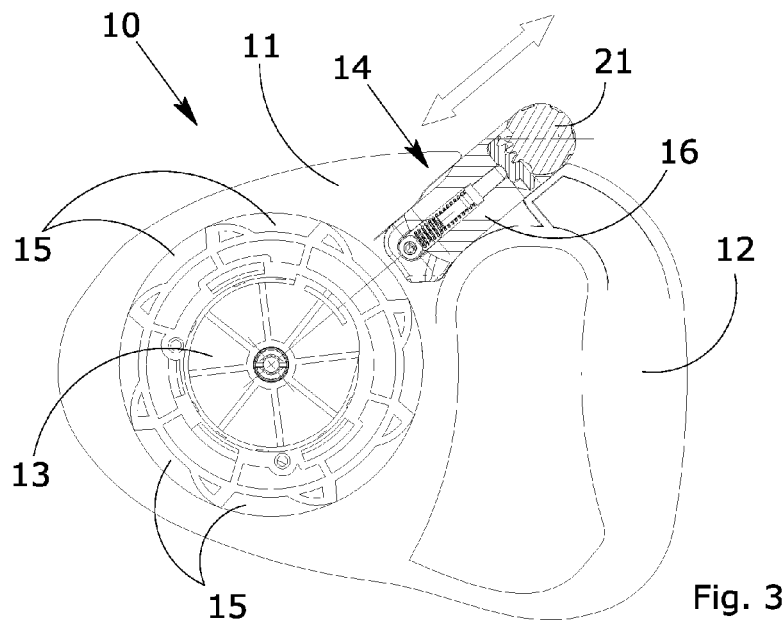
FIG. 3 shows a schematic view of a wheel winder for extensible leads equipped with a blocking device according to the invention, in the temporary closed position.

With reference to the accompanying drawings, the winder for extensible leads equipped with the blocking device according to the invention is indicated overall with the reference number 10, and substantially consists of a box-like casing 11, provided with an anatomical grip 12. Inside the box-like casing is a wheel or winder 13 for the cord, the outer part of which, attached to a spring-clip which is fastened to the pet's collar, protrudes through an appropriate opening in an area opposite to the grip area.

The tape or cord protruding from the casing 11 with grip 12 can extend for up to several metres when it is unwound from the wheel 13, and rewind automatically and be blocked in the required position and at the required length by intervention of an internal mechanism indicated overall with the reference number 14.

Figure 4:
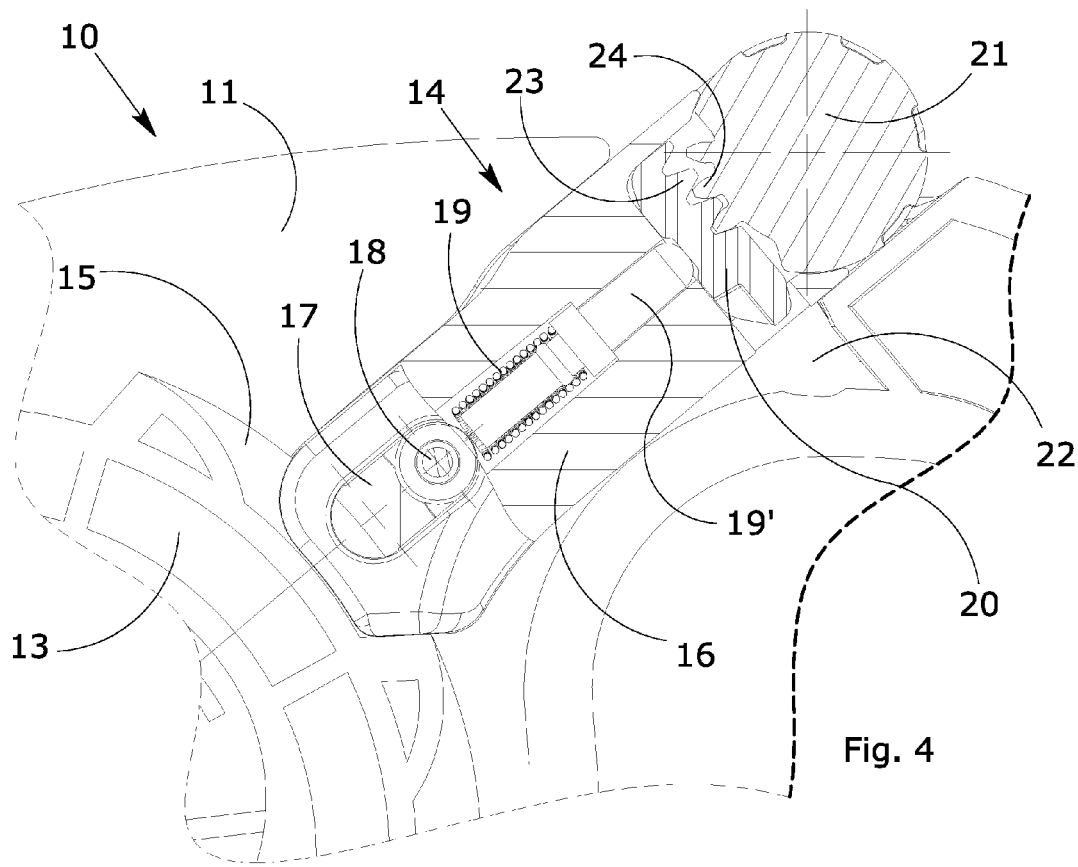
FIG. 4 is a detailed schematic view of the blocking device according to the invention.
Figure 5:
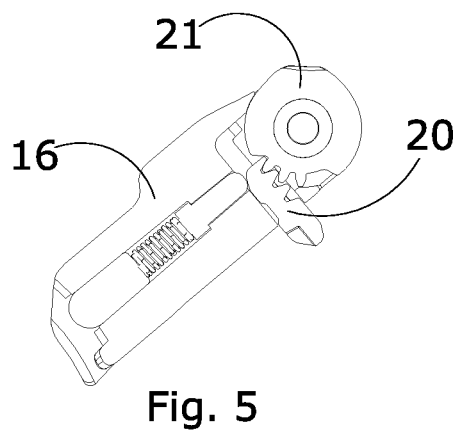
FIGS. 5 and 6 represent schematic views showing the first version of the blocking device according to a first embodiment with a standard tooth.
Figure 6:
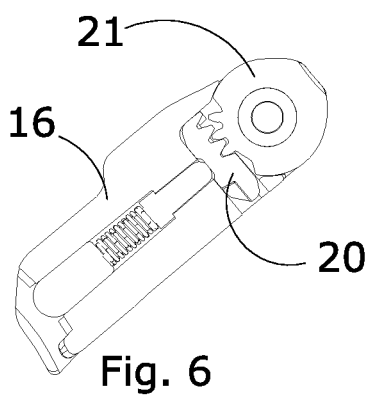

The winder 13 is equipped along its edge with a series of notches 15 designed to be engaged by a pushbutton 16, clearly visible in FIG. 4, the elongated body of which slides axially in a housing in the box-like casing 11 and communicating with the wheel 13.

As can be seen in FIG. 4, the pushbutton 16, which is activated by the fingers of one hand when using the lead to partially or totally block the extension of the lead, slides longitudinally along the section allowed by a slot 17 which houses a fixed pin 18, acting in contrast to a spring 19.

The particularity of the invention is due to the presence of a cursor 20 which, according to a first embodiment, is activated by a thumb-turn 21, positioned on the head of the pushbutton 16, which can move the cursor from a pushbutton blocked position to a free sliding position, entering and exiting transversally to the sliding axis of the pushbutton 16 with respect to a housing 22 located in a lower area by means of a rotation or translation movement, according to the technical solution adopted.

The cursor 20 is positioned in contrast with a pin 19' in contrast with a spring, which allows the cursor to remain in one of the two blocked or free positions.

In fact, both the cursor 20 and the thumb-turn 21 are equipped with a connection (23, 24) which allows transfer of the rotation movement of the thumb-turn 21 to the rotation or translation movement of the cursor 20. This transfer can be achieved by means of a rack solution, or by fork systems according to various embodiments which will be described below.

Entry of the cursor 20 in the housing 22 is naturally only possible when the pushbutton 16 is pushed to the partial block position in one of the housings 15 of the wheel 13, that is to say in the position which can be seen in FIGS. 2 and 4.

According to the invention it is therefore possible to easily block the extensible cord temporarily using the partial block of the winding device 13 which intervenes when the pushbutton 16 is pressed, penetrating one of the housings 15 of the wheel and blocking the cord.

If it is necessary to maintain complete blocking of the cord, even when removing the fingers from the pushbutton, the thumb can be used to rotate the thumb-turn 21, so that the mechanism causes the cursor 20 to penetrate, transversally to the sliding axis of the pushbutton 16, the housing 22 located below it.

According to other embodiments shown in FIGS. 7 to 14, blocking devices with the following kinematic movement system features are described below.

Figure 7:
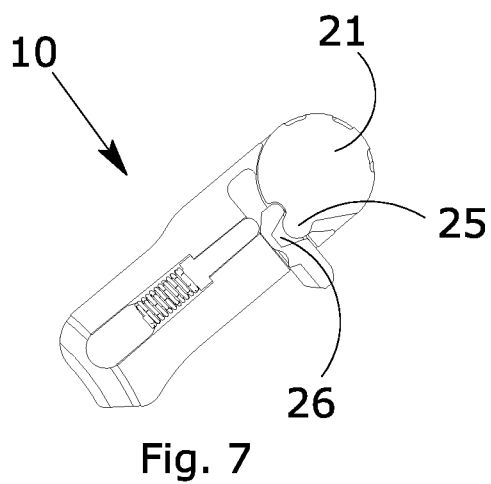
FIGS. 7 and 8 represent schematic views showing the second version of the perpendicular rack blocking device.
Figure 8:
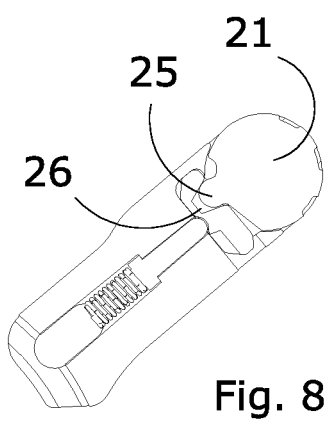

A second embodiment of the blocking device shown in FIGS. 7 and 8 represents a system whereby the thumb-turn 21 acts on the blocking cursor 20 by means of a tooth 25 accommodated in a housing 26 in the cursor itself.

Figure 9:
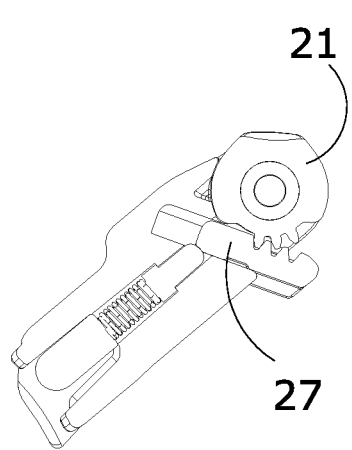
FIGS. 9 and 10 are schematic views showing a third embodiment of the diagonal rack blocking device.
Figure 10:
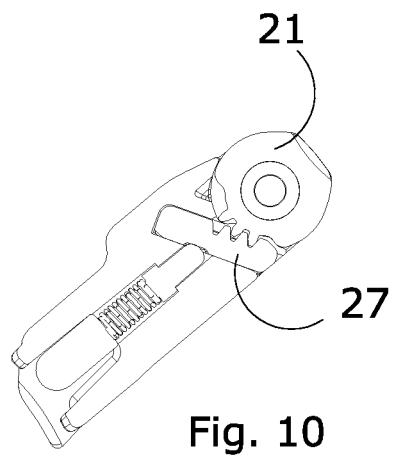

A third embodiment, shown in FIGS. 9 and 10, presents a blocking cursor 27 positioned diagonally with respect to the sliding axis of the pushbutton. In this case, the thumb-turn can engage with the cursor by means of an inclined rack or a tooth.

A fourth version shown in FIGS. 11 and 12 is equipped with a tooth blocking device 28 which in this case is the double gear type, as it is fitted on a body 29 which is pivoted at point 30 inside the pushbutton.

Finally, FIGS. 13 and 14 show a version which foresees the use of a double gear as in the previous solution, with the difference that in this case, instead of using a rack engagement, a fork engagement 31 of the thumb-turn is used to move a pin 32 of the pivoted body 29.

As can be noted, the lead according to the invention is equipped with a winding device for an extensible cord, provided with safety blocking means that are simple to produce and extremely practical to use.

The invention is described above with reference to a preferred embodiment. It is nevertheless clear that the invention is subject to numerous variations which lie within the scope of its disclosure, in the framework of technical equivalents.

The invention claimed is:

1. An extensible cord lead comprising a casing containing a winding wheel (13) equipped, along its edge, with a series of notches (15) intercepted by a pushbutton (16) to allow partial or total blocking of a cord, whereby the pushbutton (16) is equipped with a forward position blocking device consisting of a cursor (20) which slides in a transverse direction with respect to a sliding axis of the pushbutton (16) in which it is inserted, said cursor (20) being activated by a thumb-turn (21) located on a head of the pushbutton (16), said cursor (20) being able to move from a blocked position to free sliding of the pushbutton (16), entering and exiting transversally to the sliding axis of the pushbutton (16), in a housing (22) in the casing of the winding wheel (13), wherein contact surfaces of the cursor (20) and of the thumb-turn (21) engage with each other.

2. The lead of claim 1, wherein the pushbutton has an elongated body sliding axially along the housing in the casing and communicating with the winding wheel.

3. The lead of claim 1, wherein the pushbutton, activated by the, fingers of one hand to partially or totally block the rotation of the wheel, slides longitudinally along a section allowed by a slot which houses a fixed pin, acting in contrast to a spring.

4. The lead of claim 1, wherein the entry of the cursor in the housing is possible when the pushbutton is pushed into the partial blocking position in one of the series of notches of the wheel.

5. The lead of claim 1, wherein the cord is temporarily blocked by means of the partial block of the wheel with the pushbutton which penetrates one of the series of notches of the wheel and blocks the extension of the cord.

6. The lead of claim 1, wherein by rotating the thumb-turn, said thumb-turn is disengaged from the cursor which, transversally to the sliding axis of the cursor, penetrates the housing.

7. The lead of claim 1, wherein contact surfaces of the cursor and of the thumb-turn are equipped with teeth which engage with each other in a rack and pinion fashion.

* * * * *